June 12, 1945.  E. W. HOFFMAN  2,377,938
LOCOMOTIVE SAND TRAP
Filed May 11, 1943
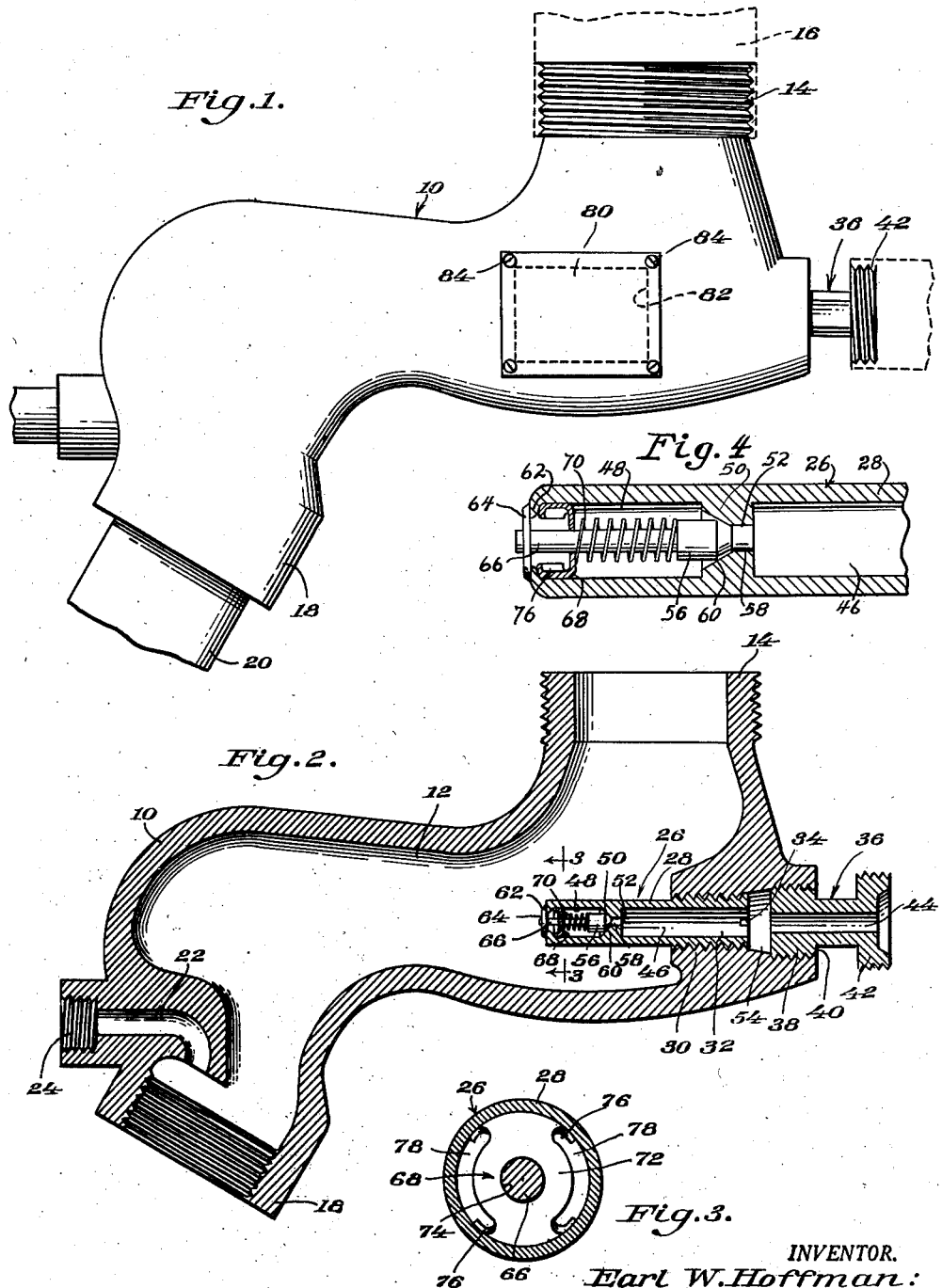
INVENTOR.
Earl W. Hoffman:
BY
Victor J. Evans & Co.
ATTORNEYS Patented June 12, 1945

2,377,938

UNITED STATES PATENT OFFICE 2,377,938

LOCOMOTIVE SAND TRAP

Earl W. Hoffman, Ogden, Utah

Application May 11, 1943, Serial No. 486,551

3 Claims. (Cl. 291—11)

My invention relates to sanding devices for locomotives and the like, and has among its objects and advantages the provision of an improved sand trap.

In the accompanying drawing:

Figure 1 is a side view of a sand trap in accordance with my invention.

Figure 2 is a longitudinal sectional view.

Figure 3 is an enlarged sectional view taken along the line 3—3 of Figure 2, and Figure 4 is a longitudinal section on an enlarged scale of the inner portion of the air nozzle and its valve assembly.

In the embodiment of the invention selected for illustration, I make use of a sand trap body 10 having a passage 12 communicating with a coupling extension 14 adapted for connection with a delivery pipe 16 leading to the sand supply (not shown). This passage also has communication with a coupling extension 18 for connection with a pipe 20 for delivering sand to one of the wheels or the the rails. A passage 22 is provided in the body 12 for directing a cleaning blast of air into the pipe 20 at the beginning and end of each sanding operation. A threaded opening 24 is provided for connection with a line for supplying the air blast.

My invention resides principally in a nozzle 26 for delivering air under pressure into the trap to force sand from the trap and into the pipe 20. The nozzle 26 comprises a tubular stem 28 having one end threaded at 30 for threaded connection in a bore 32 in the sand trap body. A screw driver slot 34 is provided in one end of the stem 28 to facilitate placement of the nozzle, which slot is accessible in the absence of a stud union 36. The stud union includes a head 38 threaded into a bore 40 in the sand trap, in addition to a threaded head 42 for connection with an air pressure line (not shown).

The stud union 36 is provided with a passage 44 for the delivery of air under pressure to the nozzle 26. Both the passage 22 and the nozzle 26 are supplied with air at will through actuation of the usual operator's control valve (not shown). Such valves are old and well known in the art and need not be described in detail.

The stem 28 has two bores 46 and 48 separated by an annular flange 50, but the two bores have communication through the medium of a small opening 52 constituting the inside diameter of the flange 50. The bore 46 opens into a chamber 54 having communication with the passage 44, while the bore 48 opens into the cavity 12. Inside the bore 48 is mounted a valve 56 provided with a pin 58 slidably supported in the opening 52. Angular valve seat faces 60 are provided on the flange 50 and the valve 56, the valve normally being seated in accordance with Figure 2.

The inner end of the stem 28 is provided with an annular flange 62, and a sealing cap 64 normally lies adjacent this end of the stem 28. This cap is attached to a pin 66 fixed to the valve 56 and slidably guided in a spring retainer 68.

A compression spring 70 is interposed between the spring retainer 68 and the valve 56 to yieldingly hold the valve in its normal position. In Figure 3, the retainer 68 comprises a flat area 72 having an opening 74 which slidably guides the pin 66 and coacts with the pin 58 to maintain the valve 56 coaxial with the stem 28. The cap 64 is arranged at right angles to the pin 66 so as to lie in sand sealing proximity to the end of the stem 28 when the valve 56 is in its normal position. The area 72 terminates in two wings 76 which are curved to bear against the inner face of the bore 48. The spring retainer is of flexible material so that it may be bent for insertion in the flanged end of the bore 48, and the flange 62 prevents the spring retainer from being pressed out of the bore.

In operation, the valve 56 is opened through admission of air under pressure in the bore 46. This air pressure moves the valve 56 off its seat, namely, the flange 50, and the air passes through the bore 48 and through the passages 78 between the spring retainer 68 and the pin 28. The air then passes into the cavity 12 through the space between the cap 64 and the end of the stem 28, this cap being moved away from the end of the stem as a unit with the valve 56.

The nozzle 26 is positive in action, and is so designed as to prevent entrance of sand which would plug the passage 52. The nozzle comprises an assembly which is easily installed in the sand trap body. The air blast is discharged into the sand trap radially at the end of the stem 28. This blast tends to breakup scale and lump formations so that the sand will flow readily from the sand trap.

The body of the sand trap is provided with a removable plate 80 for covering an inspection opening 82. Screws 84 detachably connect the plate with the trap body.

Without further elaboration, the foregoing will so fully explain by invention, that others may, by applying current knowledge, readily adapt the same for use under various conditions of service.

I claim:

1. A sand trap of the type described comprising a body having a cavity and provided with a sand inlet and a sand outlet, said body being provided with an opening in the nature of first and second coaxial bores, a nozzle tube threaded into said first bore and accessible from a position exteriorly of said body through said second bore, a stud union threaded into said second bore and having a passage for delivering air under pressure to said nozzle tube, said nozzle tube having one end extending into said cavity and provided with an internal flange constituting a valve seat and forming two compartments in the body, a valve body adapted to seatingly engage said valve seat, said valve body having a pin slidably guided in said internal flange, a pin fixed to said valve body and extending to a position exteriorly of the inner end of said nozzle tube, a cap fixed to said pin, a spring retainer inserted in the discharge end of said nozzle tube and having an opening slidably guiding said pin, said spring retainer being tensioned against the inner face of said nozzle tube and the latter having an end flange arranged to restrain the spring retainer from accidental shifting outwardly of the nozzle tube, and a spring interposed between said spring retainer and said valve body to urge the latter against said flange but yielding upon introduction of air under pressure in the nozzle tube to pass the air to said cavity, said spring retainer being shaped to provide air passages, said cap normally lying in sand sealing relationship with the inner end of said nozzle tube but being moved therefrom through unseating of said valve body.

2. The invention described in claim 1, wherein the spring retainer is of flexible material and has a flat area provided with an opening guiding the pin, and wings bent for insertion in the nozzle tube to hold the spring retainer in proper position therein.

3. A sand excluding air admission means for sand traps, comprising a two part member, each of which is designed to be received in a single opening formed in the wall of a sand trap, one part being accessible from the exterior for connection with an air admission pipe, the other part being spaced from the first part and comprising a tube formed with an internal annular flange forming two compartments in the tube, one of which communicates with the exterior part of said member, said flange having a central opening and beveled about said opening to provide a valve seat, a valve body on said seat and having a pin formed thereon, said valve body and pin being retained in the other compartment, a cap carried by the free end of the pin and seatable over the inner end of said tube to close said other compartment, the end of said tube under said cap having an internal flange, a spring retainer around said pin having wings engaging the wall of said tube and said internal flange of said compartment to position said retainer, said retainer having openings therethrough to provide passages for air, and a spring about said pin and compressed between said valve and said retainer to urge the valve in place on its seat.

EARL W. HOFFMAN.